US012317777B2

(12) United States Patent
Apte et al.

(10) Patent No.: US 12,317,777 B2
(45) Date of Patent: Jun. 3, 2025

(54) HARVESTER UNLOADING CONTROL SYSTEM

(71) Applicant: Deere & Company, Moline, IL (US)

(72) Inventors: Ashish Apte, Pune (IN); Sujana Ramesh, Pune (IN)

(73) Assignee: Deere & Company, Moline, IL (US)

( * ) Notice: Subject to any disclaimer, the term of this patent is extended or adjusted under 35 U.S.C. 154(b) by 227 days.

(21) Appl. No.: 17/860,396

(22) Filed: Jul. 8, 2022

(65) Prior Publication Data

US 2024/0008404 A1    Jan. 11, 2024

(51) Int. Cl.
*A01D 41/127*    (2006.01)
*A01B 69/04*    (2006.01)
*A01D 90/12*    (2006.01)
*G05D 1/00*    (2024.01)

(52) U.S. Cl.
CPC ........ *A01D 41/1278* (2013.01); *A01B 69/008* (2013.01); *A01D 90/12* (2013.01); *G05D 1/021* (2013.01)

(58) Field of Classification Search
CPC .. A01D 41/1278; A01D 90/12; A01B 69/008; G05D 1/021
See application file for complete search history.

(56) References Cited

U.S. PATENT DOCUMENTS

| 6,385,515 B1 | 5/2002 | Dickson et al. |
| 7,734,387 B1 | 6/2010 | Young et al. |
| 10,959,378 B2 | 3/2021 | Byttebier et al. |
| 2012/0215409 A1* | 8/2012 | Wang ............... A01D 43/085 701/50 |
| 2020/0128734 A1* | 4/2020 | Brammeier ....... A01D 41/1275 |
| 2021/0127582 A1 | 5/2021 | Burnley et al. |
| 2021/0294337 A1* | 9/2021 | Van Mill ............. G05D 1/0246 |
| 2021/0362705 A1* | 11/2021 | Singh ................. A01B 69/008 |
| 2021/0365036 A1* | 11/2021 | Dix .................... G05D 1/0238 |

(Continued)

FOREIGN PATENT DOCUMENTS

| EP | 2361494 B1 | 1/2013 |
| EP | 2579701 81 | 3/2015 |
| EP | 2812267 B1 | 2/2021 |

(Continued)

OTHER PUBLICATIONS

Nabbe, "Extending the Path-Planning Horizon", Jul. 2005, 124 pages. https://www.ri.cmu.edu/pub_files/pub4/nabbe_bart_2005_1/nabbe_bart_2005_1.pdf.

*Primary Examiner* — Jelani A Smith
*Assistant Examiner* — Toya Pettiegrew
(74) *Attorney, Agent, or Firm* — Christopher J. Volkmann; Kelly, Holt & Christenson, PLLC

(57) ABSTRACT

A harvester receives obstacle and turn information indicative of positions of obstacles and the locations of turns. A relative position of the harvester and a receiving vehicle is detected and control signals are generated to control unloading functionality, which may include an unloading auger, a spout position and/or a flap position during unloading, while the obstacle is being avoided and/or while a turn is being navigated. An indication of some or all of the relative position, obstacle and turn information, and control signals can be uploaded to a remote server computing system for use in performing future machine control and analytics.

20 Claims, 10 Drawing Sheets

(56) References Cited

U.S. PATENT DOCUMENTS

2022/0015290 A1    1/2022  Yao et al.
2024/0037806 A1*   2/2024  Christiansen ........... G06T 11/00

FOREIGN PATENT DOCUMENTS

| WO | 2015121870 A1 | 8/2015 |
| WO | 2020206942 A1 | 10/2020 |
| WO | 2021041165 A1 | 3/2021 |

* cited by examiner

HARVESTER UNLOADING CONTROL SYSTEM

FIELD OF THE DESCRIPTION

The present description relates to harvesters. More specifically, the present description relates to controlling unloading functionality on a harvester during obstacle avoidance and turning.

BACKGROUND

There are a variety of different types of agricultural harvesters. Some such harvesters include combine harvesters, forage harvesters, sugarcane harvesters, among others. Such agricultural harvesters often work along with receiving vehicles, such as grain carts, billet carts, or other receiving vehicles that drive in close proximity to the harvester to receive harvested material that is unloaded from the harvester during the harvesting process. To enhance productivity, it can be desirable to maintain the uninterrupted operation of the harvester and receiving vehicles. If harvesting is interrupted, and as downtime increases, harvesting efficiency can be negatively affected. Longer interruptions and greater downtime result in greater inefficiency.

However, there are some difficulties in maintaining uninterrupted operation of the harvester and receiving vehicle. For instance, some fields have obstacles which may cause the harvester and/or receiving vehicle to move out of their current paths to avoid the obstacle. While avoiding the obstacle, the operator of the harvester must often terminate the unloading operation, such as by shutting off an unloading auger, until the obstacle has been avoided and the vehicles resume their paths.

Also, the harvester may navigate through turns while following a harvesting path. During the turn, the operator also often turns off the unloading auger or otherwise terminates the unloading operation until the operator has navigated the harvester through the turn and until the two vehicles (the harvester and receiving vehicle) are back in a desired position relative to one another. These types of tasks (turning on and off the unloading functionality) can increase the fatigue level of the operator. Also, if executed improperly, this can result in grain loss or downtime during harvest. This can also increase the time needed to perform a harvesting operation, which decreases harvesting efficiency.

The discussion above is merely provided for general background information and is not intended to be used as an aid in determining the scope of the claimed subject matter.

SUMMARY

A harvester is harvesting material and unloading the material into a receiving vehicle. The harvester receives obstacle information and turn information indicative of positions of obstacles and the locations of turns. A relative position of the harvester and the receiving vehicle is detected and control signals are generated to control unloading functionality, which may include an unloading auger, a spout position, and/or a flap position, during unloading, while an obstacle is being avoided and/or while a turn is being navigated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, when an agricultural harvester is unloading harvested material into a receiving vehicle, the harvester or receiving vehicle may encounter an obstacle. The obstacle may be approached by the harvester or the receiving vehicle so that one or both vehicles must deviate from their desired path in order to avoid the obstacle. This can mean that the operator of the harvester must manually adjust the position of the spout or flap to accommodate for the change in the relative position of the two vehicles with respect to one another, so that harvested material is not inadvertently dumped on the ground. Manually controlling the spout and/or flap in this way can increase operator fatigue. In some cases the receiving vehicle can move out of range of the unloading functionality on the harvester so that the unloading auger on the harvester must be turned off until the two vehicles resume a desired position relative to one another (such as after the obstacle has been avoided). In another example, when the harvester makes a turn, the relative position of the two vehicles may change, again requiring adjustment of the spout position, flap position, or other unloading functionality.

The present description thus proceeds with respect to a system that receives obstacle and turn data indicative of the location of obstacles in a field, and turns that will be made on the field by the harvester. Control signals are generated to automatically control the unloading auger, the spout position, and the flap position on the agricultural harvester in order to accommodate for changes in the relative position between the harvester and the receiving vehicle that will happen in order to avoid the obstacle or and/or make the turn.

Figure 1:
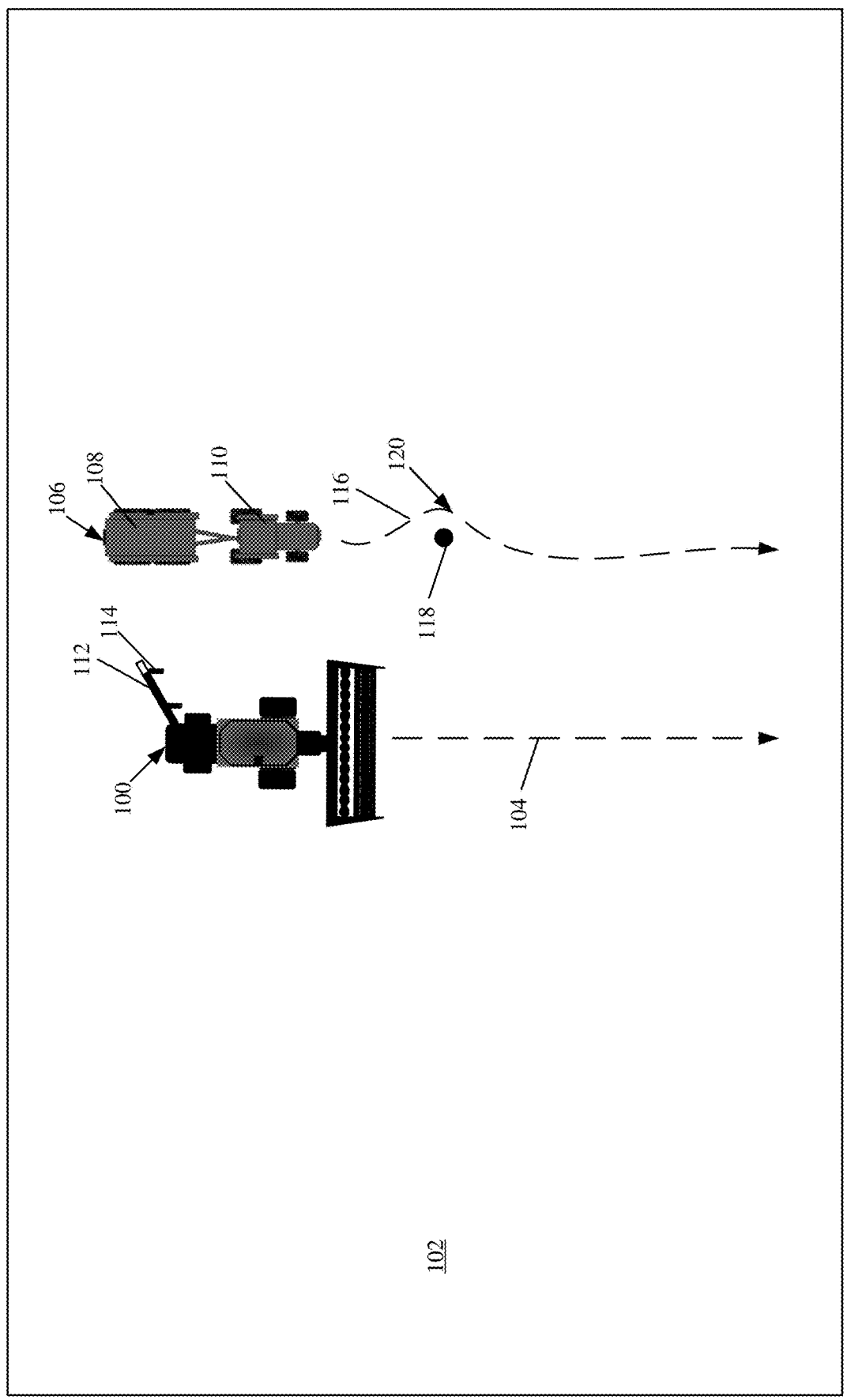
FIG. 1 is a pictorial illustration of a harvester and a receiving vehicle encountering a static obstacle.

FIG. 1 is a pictorial illustration of one example of a harvester 100 that is harvesting in a field 102 along a route or travel path 104. During harvesting, harvester 100 unloads harvested material into a receiving vehicle 106 which may be a grain cart 108 pulled by a towing vehicle (such as a tractor 110) or another receiving vehicle. Harvester 100 unloads the harvested material through a spout 112 that is fed by an unloading auger. The spout 112 may be movable relative to a frame of the harvester 100. A flap 114 can be mounted to the spout and movable relative to the spout and controlled in order to control the trajectory of the harvested material leaving spout 112 so that the material lands in the grain cart 108 of receiving vehicle 106.

In the example shown in FIG. 1, receiving vehicle 106 is traveling in a side-by-side unloading position relative to harvester 100. Therefore, receiving vehicle 106 travels along a travel path 116 that is generally parallel to the travel path 104 of harvester 100. However, FIG. 1 shows that a static obstacle 118 (meaning that the position of obstacle 118 does not change over time) is in the path 116 of receiving vehicle 106 so that, in order to avoid obstacle 118, receiving vehicle 106 must deviate (generally shown at 120) from path 116, around obstacle 118. This deviation will change the relative position of receiving vehicle 106, relative to harvester 100. In such cases, the position of spout 112 and/or flap 114 must be changed so that the harvested material continues to land in grain cart 108 during the deviation 120. In some cases, the receiving vehicle 106 may deviate to such an extent that it is out of range of the harvested material being unloaded through spout 112. In that case, the unloading auger on harvester 100 should be stopped so that the harvested material is not inadvertently dumped on the ground, until the receiving vehicle 106 again resumes a position relative to harvester 100 where it is within range of the harvested material being unloaded through spout 112 and flap 114, at which point the unloading auger can again be turned on to continue unloading.

Figure 2:
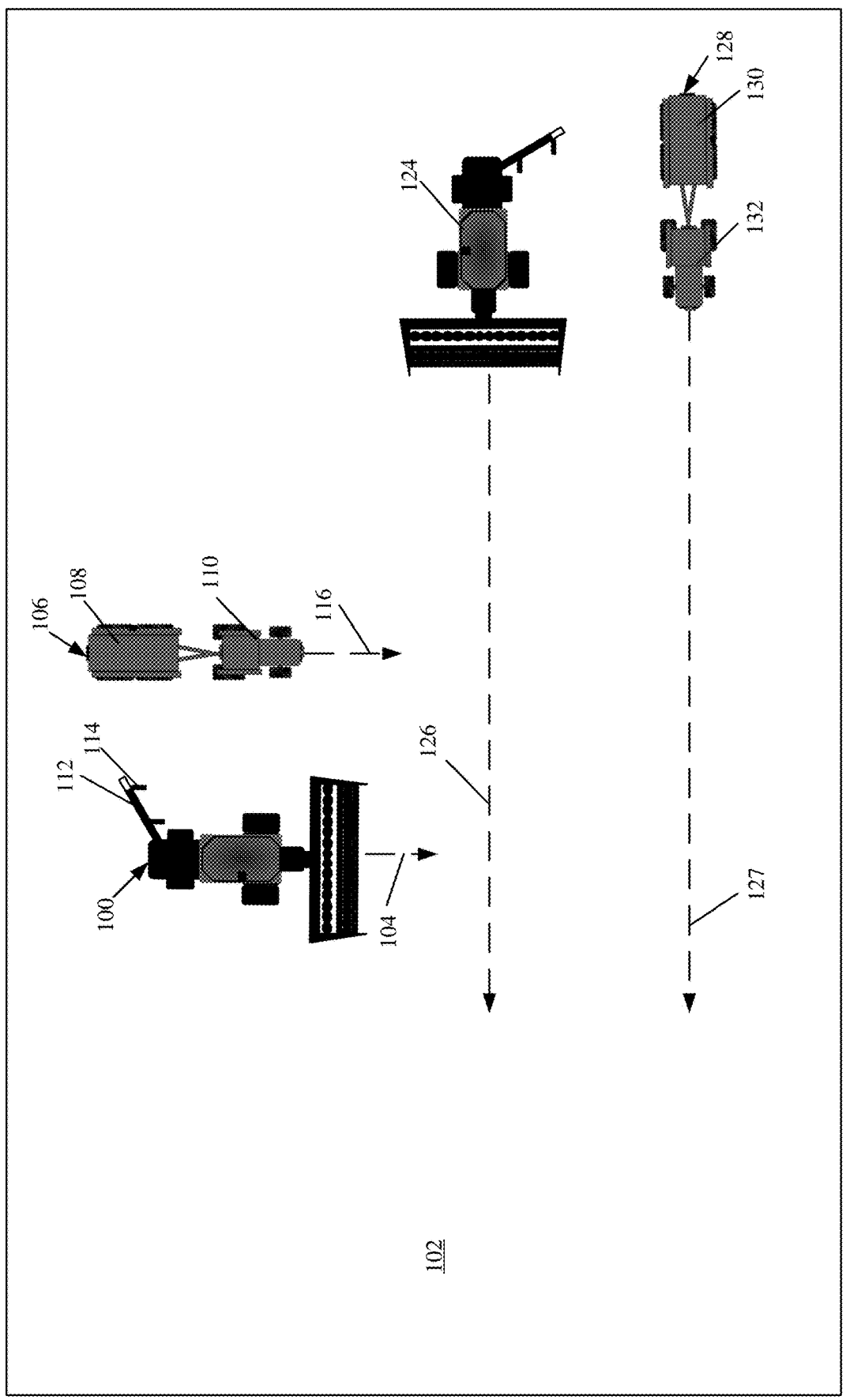
FIG. 2 is a pictorial illustration indicating one example of how dynamic obstacles, which can be present, are located on a field.

In some cases, an obstacle is a dynamic obstacle meaning that the position of the obstacle changes over time. FIG. 2, for instance, shows another example of harvester 100 harvesting field 102, and similar items to those shown in FIG. 1 are similarly numbered in FIG. 2. However, FIG. 2 also shows that a second harvester 124 is also harvesting along a path 126 that is generally perpendicular to the path 104 of harvester 100. Harvester 124 is shown traveling along path 126 and unloading harvested material into a receiving vehicle 128 which comprises a grain cart 130 and towing vehicle 132 traveling along path 127. In the example shown in FIG. 2, if both harvesters 100 and 124 continue along their paths at the same rate of speed, they may collide with one another. Therefore, for the sake of the present description, harvester 124 and its corresponding receiving vehicle 128 are referred to as a dynamic obstacle because the position of harvester 124 changes over time.

In such an example, instead of steering harvester 100 and/or receiving vehicle 106 in a way that diverts from paths 104 and 116, respectively, in order to avoid harvester 124 and receiving vehicle 128, it may be sufficient for harvester 100 and receiving vehicle 106 to simply pause and wait for harvester 124 and receiving vehicle 128 to continue along paths 126 and 127, respectively. When harvester 124 and receiving vehicle 128 are no longer going to collide with harvester 100 and receiving vehicle 106, harvester 100 and receiving vehicle 106 can again commence forward motion along paths 104 and 116, respectively.

In order to accommodate such obstacles, harvester 100 illustratively receives the location of obstacles and an indication of whether the obstacles are dynamic or static obstacles. If the obstacles are dynamic, harvester 100 can also receive an indication of the direction of travel and the travel speed of the dynamic obstacle as well. The obstacles can be detected during runtime by sensors on harvester 100 or receiving vehicle 106 or both. In another example, the location of the obstacles can be identified prior to the harvesting operation, or prior to harvester 100 and receiving vehicle 106 reaching those obstacles, by a scout vehicle which may be an unmanned aerial vehicle, a manned or unmanned ground vehicle, or aerial images, or any of a wide variety of other mechanisms. Harvester 100 also illustratively includes an unloading control system (described in greater detail below) that controls the position of spout 112 and flap 114 and the on/off state of the unloading auger. Therefore, as harvester 100 and/or receiving vehicle 106 approach an obstacle, the unloading control system can generate control signals to control the position of spout 112 and flap 114 as well as the on/off state of the unloading auger, to accommodate for any changes in the relative position of receiving vehicle 106 relative to harvester 100, so that no grain is inadvertently lost.

Figure 3:
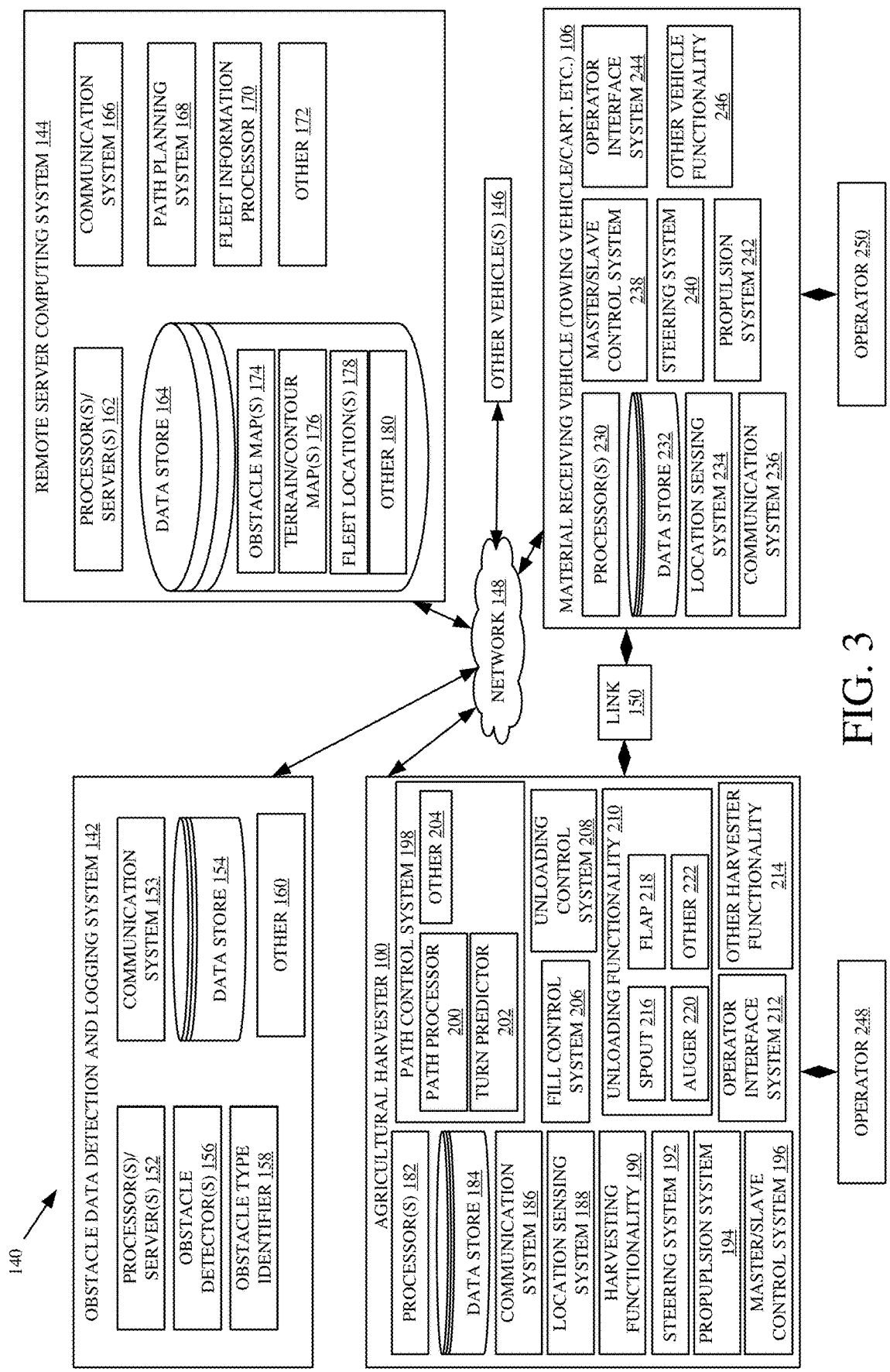
FIG. 3 is a block diagram showing one example of an agricultural system.

FIG. 3 is a block diagram showing one example of an agricultural system 140, in more detail. Agricultural system 140 illustratively includes agricultural harvester 100, material receiving vehicle 106, obstacle data detection and logging system 142, remote server computing system 144, and other vehicles 146. The items in system 140 can be connected for communication with one another over network 148. Network 148 may thus be a wide area network, a local area network, a Wi-Fi network, a Bluetooth network, a near field communication network, a cellular network, or any of a wide variety of other networks or combinations of networks. Also, in FIG. 3, agricultural harvester 100 is shown connected to material receiving vehicle 106 by a link 150. Link 150 can also be any of the types of links described above with respect to network 148, or other communication links.

In the example shown in FIG. 3, obstacle data detection logging system 142 illustratively detects and logs the location of obstacles in different fields. System 142 can be deployed on a harvester, on a scout vehicle, or in other ways. The location of the obstacles, and an indication as to whether the obstacles are static or dynamic obstacles, can be stored at remote server computing system 144 for use in path planning, or for download to agricultural harvester 100 or other vehicles 146 for controlling unloading of harvested material from agricultural harvester 100 to material receiving vehicle 106. Agricultural harvester 100 can also communicate with other vehicles 146 so that the vehicles know each other's location, direction, travel speed, etc. Other vehicles 146 may be other harvesters, other material receiving vehicles, or other vehicles.

In the example shown in FIG. 3, obstacle data detection and logging system 142 includes one or more processors 152, communication system 153, data store 154, one or more obstacle detectors 156, obstacle type identifier 158, and other items 160. The obstacle detectors 156 can be optical detectors, such as a camera with associated image processing functionality, radar systems, LIDAR systems, or any of a wide variety of other detectors. Obstacle type identifier 158 may be logic that identifies whether the obstacle is moving or stationary and if moving, the direction and/or speed of travel. The obstacle detectors 156 can also identify the location of the obstacles based on a position detection system, such as a GPS receiver, or a dead reckoning system. Obstacle type identifier 158 can identify the obstacle as a static obstacle or a dynamic obstacle (as well as the obstacle heading and travel speed) based upon whether and how the position of the obstacle changes over time. Communication system 153 can then communicate the existence of the obstacle and its location and obstacle type to remote server computing system 144 or to agricultural harvester 100 and other vehicles 146.

Remote server computing system 144 can also include one or more processors or servers 162, data store 164, communication system 166, path planning system 168, fleet information processor 170, and other items 172. Data store 164 may include obstacle maps 174, terrain/contour maps 176, fleet locations 178, and other items 180. Obstacle maps 174 can include maps of obstacles along with their geographic location and an indication of whether they are static or dynamic. The information from maps 174 can be received from obstacle data detection logging system 142. Terrain/contour maps 176 identify the terrain or contour of fields over which harvester 100 is or will be operating. Fleet locations 178 may identify the location of harvester 100 and material receiving vehicle 106 as well as other vehicles 146 in a fleet. The vehicles may be operating in the same field or different fields. Fleet information processor 170 may receive information indicative of which vehicles belong to a fleet, along with location information corresponding to each vehicle, to generate fleet locations 178 and other information. Path planning system 168 can be used to generate a path plan for agricultural harvester 100 and material receiving vehicle 106 through a field based upon the locations of obstacles, the contour and terrain in a field, the locations of other fleet vehicles, etc. The path plan generated by path planning system 168 can be stored in data store 164 and/or output to agricultural harvester 100. The path plan may identify the route to be followed by harvester 100 along which the harvester 100 will encounter the fewest obstacles (if possible) along with turns to be made by harvester 100 in traveling along the path. The turns may be identified as a turn location and turn direction, or in other ways. Communication system 166 can be used to communicate over network 148 or in other ways. Therefore, the particular communication system 166 may depend on the type of network 148.

In the example shown in FIG. 3, agricultural harvester 100 includes one or more processors 182, data store 184, communication system 186, location sensing system 188, harvesting functionality 190, steering system 192, propulsion system 194, master/slave control system 196, path control system 198 (which itself may include path processor 200, turn predictor 202, and other items 204), fill control system 206, unloading control system 208, unloading functionality 210, operator interface system 212, and other harvester functionality 214. Operator interface system 212 can include a wide variety of operator interface mechanisms, such as joysticks, steering wheels, levers, pedals, buttons, display screens, touch sensitive display screens, speech recognition and syntheses systems, speakers, microphones, etc. Unloading functionality 210 can include spout 216, flap 218, auger 220, and other items 222. Spout 216 includes a positioning mechanism that can position spout 216 relative to a frame of harvester 100. Flap 218 illustratively includes a positioning system which can position the flap 218 relative to the outlet of spout 216, and auger 220 may include driving functionality that drives the auger, wherein the driving functionality can be turned on or off. The positioning systems for spout 216 and 218 and the drive mechanism for auger 220 can be hydraulic systems, electric systems, pneumatic systems, or any of a wide variety of other types of systems.

Material receiving vehicle 106 may also include (on the towing vehicle, on the cart, or on another vehicle) one or more processors 230, data store 232, location sensing system 234, communication system 236, master/slave control system 238, steering system 240, propulsion system 242, operator interface system 244, and other vehicle functionality 246. Location sensing system 234 can be any of a wide variety of location sensing systems such as those discussed above with respect to system 188 and discussed elsewhere herein. Communication system 236 also facilities communication among the vehicle 106 and with harvester 100 over link 150 and with other items over network 148. Master/slave control system 238 may receive signals from master/slave control system 196 and automatically control steering system 240 and propulsion system 242. Steering system 240 can be used to steer vehicle 106 while propulsion system 242 is used to drive the movement of vehicle 106. Operator interface system 244 can include mechanisms such as described above with respect to operator interface system 212 or other mechanisms.

In the example shown in FIG. 3, operator 248 uses operator interface system 212 in order to control and manipulate agricultural harvester 100. Operator 250 uses operator interface system 244 in order to control and manipulate material receiving vehicle 106.

Before describing the overall operation of agricultural system 140 in more detail, a description of some of the items in system 140, and their operation, will first be provided. Communication system 186 can communicate with material receiving vehicle 106 over link 150 and with the other items in agricultural system 140 over network 148. Communication system 186 also illustratively facilities communication among the various items on harvester 100. Therefore, communication system 186 can be a controller area network (CAN) bus and controller and other communication system functionality for communication over link 150 and over network 148.

Location sensing system 188 illustratively senses the location of agricultural harvester 100. System 188 can be a global navigation satellite system (GNSS) receiver, or any of a wide variety of other location sensing systems. System 188 may also detect or generate an output indicative of the orientation, heading, and speed of harvester 100 as well as its pose (i.e., the combination of orientation and position relative to a global or local coordinate system). Therefore, system 188 can include accelerometers and other functionality.

When harvester 100 is a combine harvester, harvesting functionality 192 may include a cutter, a header, and grain handling functionality (such as a separator, a thresher, among other things). Steering system 192 illustratively steers agricultural harvester 100 while propulsion system 194 drives the motion of agricultural harvester 100. Steering system 192 can include steerable wheels, a steering wheel, joysticks, tracks, etc. Propulsion system 194 can include an engine, a drivetrain, individual drive motors for each wheel, or set of wheels, among other things.

Path control system 198 may receive a path from path planning system 168 in remote server computing system 144 or elsewhere, and identify a path that harvester 100 is to take. Path control system 198 can then automatically control steering system 192 and propulsion system 194, or the path can be output so that operator 248 can navigate harvester 100 along the path. Turn predictor 202 identifies upcoming turns based upon the path.

Master/slave control system 196 can establish communication with master/slave control system 238 over link 150 and control material receiving vehicle 106 to keep vehicle 106 in a desired position relative to harvester 100. System 196 can, for example, send "nudge" signals to master/slave control system 238 to cause vehicle 106 to accelerate or decelerate briefly relative to harvester 100 to nudge vehicle 106 forward or rearward relative to harvester 100 in order to keep vehicle 106 in a desired spatial relationship relative to harvester 100. These "nudge" signals can be generated and sent based on the location of harvester 100 and vehicle 106 as indicated by location sensing systems 188 and 234. The "nudge" signals can be sent based upon a sensed spatial relationship of the two vehicles sensed by a radar sensor, a LIDAR sensor, an optical sensor, or another sensor on harvester 100 or vehicle 106, or both.

Fill control system 206 can identify the position where harvested material is landing in material receiving vehicle 106 and automatically adjust the position of spout 216, or flap 218, or the relative position of the vehicle, to change the position where the harvested material is landing, in order to achieve a uniform fill of receiving vehicle 106. Fill control system 203 can identify where the material is landing in the receiving vehicle 106 using optical sensors or other sensors and determine the volume of material at a particular location in receiving vehicle 106. Fill control system 206 can then generate control signals to modify the landing point of the harvested material in receiving vehicle 106 to achieve a uniform fill.

Unloading control system 208 receives an input indicative of an upcoming obstacle or turn from obstacle data detection and logging system 142 and/or from remote server computing system 144. Recall that obstacle data detection and logging system 142 can detect obstacles during runtime, and be located on agricultural harvester 100. In another example, system 142 detects the obstacles and maps their location and provides the obstacle map 174 to remote server computing system 144. System 144 then downloads the obstacle map to unloading control system 208. Similarly, unloading control system 208 can receive an input indicative of an upcoming turn from turn predictor 202 or in other ways.

Based upon those inputs, unloading control system 208 can generate control signals to control unloading functionality 210 so that the material being unloaded from harvester 100 into receiving vehicle 106 reaches the desired location in receiving vehicle 106 even while harvester 100 or receiving vehicle 106 is avoiding an obstacle, or when a turn is being executed, etc. When the vehicles 100, 106 are approaching a turn or when the vehicles are approaching an obstacle, unloading control system 208 can be activated and begin to generate control signals in anticipation of the obstacle or turn.

For instance, when approaching an obstacle, the estimated path of harvester 100 and/or receiving vehicle 106 can be identified and the distance between the two vehicles, at it changes, can be detected by location sensing systems 188 and 234, or other location sensing systems. As the position of the two vehicles changes relative to one another to avoid the obstacle or to navigate the turn, unloading control system 208 can generate control signals to change the position of spout 216 and flap 218 so the trajectory of the harvested material, as it exits spout 216, follows receiving vehicle 106. Similarly, when the two vehicles 100 and 106 are so far apart that they are out of range of unloading functionality 210 so that the harvested material will not reach receiving vehicle 106, then unloading control system 208 can generate a control signal to stop or pause auger 220 until vehicle 106 is back within range of the unloading functionality 210. In one example, the communication systems 186 and/or 236 communicate the control signals that were generated while avoiding the obstacle or navigating the turn, the route that was followed by vehicles 100 and 106 while avoiding the obstacle or navigating the turn, and that information is documented so that the next time a harvester approaches the obstacle in that field or navigates the turn, the control signals can be anticipated, which avoids the need for computationally expensive real time processing of sensor signals. This keeps processing resources available for other processing tasks.

Figure 4:
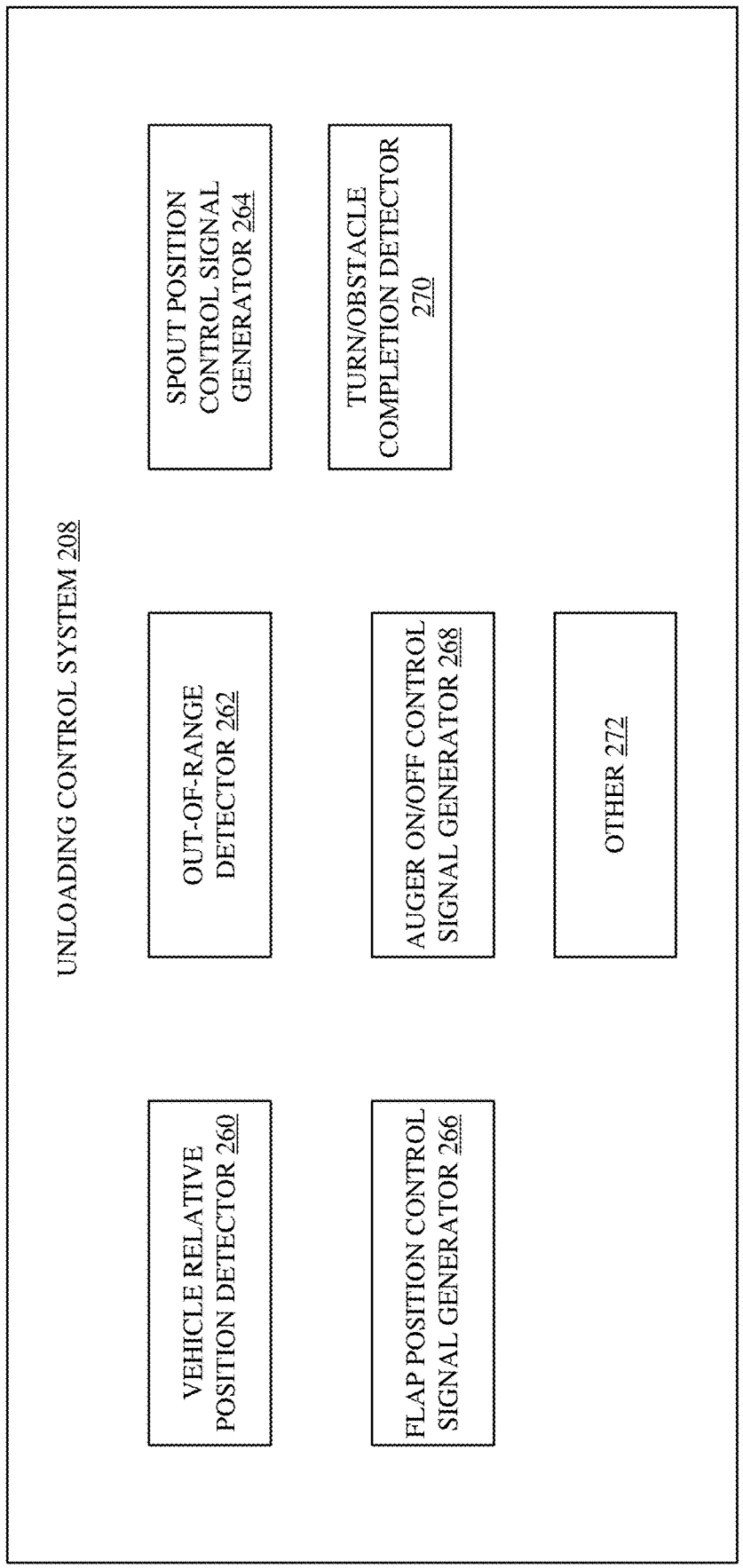
FIG. 4 is a block diagram showing one example of an unloading control system.

FIG. 4 is a block diagram showing one example of unloading control system 208 in more detail. System 208 can include vehicle relative position detector 260, out-of-range detector 262, spout position control signal generator 264, flap position control signal generator 266, auger on/off control signal generator 268, turn/obstacle completion detector 270, and other items 272. Vehicle relative position detector 260 detects the relative position of harvester 100 relative to vehicle 106. The relative position may include the distance between the two vehicles and the location (in terms of direction) of the two vehicles relative to one another. Another example of relative position is the lateral (side-to-side) distance between the two vehicles during parallel movement (such as that shown in FIG. 1). Detector 260 can detect the relative position of the two vehicles based upon an output from location sensing systems 188 and 234 or in other ways. In another example, agriculture harvester 100 may have a radar detector or an optical detector or another detector that can generate an output indicative of the location of vehicle 106 relative to harvester 100.

Out-of-range detector 262 processes the relative position of the two vehicles to determine whether unloading functionality 210 can be adjusted to transfer the harvested material from harvester material from harvester 100 to vehicle 106 or whether vehicle 106 is out of range. In one example, out of range detector 262 compares the distance between the two vehicles to a threshold distance to determine whether vehicle 106 is out-of-range. In another example, out-of-range detector 262 can use the density of the harvested material, the moisture level in the material, the type of auger 220, the wind direction and wind speed, the speed of travel of harvester 100 in vehicle 106, and/or any of a wide variety of other material to determine whether vehicle 106 is out of range.

Spout position control signal generator 264 generates a control signal to control the position of spout 216. For instance, spout 216 may be rotatable relative to the frame of harvester 100 and have a position sensor (such as a potentiometer, a Hall Effect sensor, etc.) that feeds back the position of the spout. Spout position control signal generator 264 generates a control signal to control an actuator to change the degree of rotation of spout 216 relative to the frame of harvester 100 in order to better direct harvested material into receiving vehicle 106. Similarly, it may be that spout 216 can be raised and lowered relative to the frame of harvester 100 in order to change the trajectory of the harvested material as it exits spout 216. Spout position control signal generator 264 can generate control signals to control one or more actuators which, in turn, control the position of spout 216 in these different ways.

Flap position control signal generator 266 can generate a control signal to control an actuator which controls the position of flap 218 relative to the output end of spout 216. Flap 218 may also have a sensor that senses the position of the flap. Changing the position of flap 218 can change the trajectory of the harvested material as it exits spout 216.

Thus, the position of flap can be changed to better direct the material into the receiving vehicle.

Auger on/off control signal generator 268 can generate control signals to turn auger 220 on and off based upon whether vehicle 106 is out of range, as indicated by out-of-range detector 262. Turn/obstacle completion detector 270 can detect when an obstacle has been avoided or a turn has been completed. For instance, turn/obstacle completion detector 270 may determine that the receiving vehicle 106 is in a desired position relative to harvester 100 based upon the output from vehicle relative position detector 260 or in other ways. Turn/obstacle completion detector 270 may also detect when the harvester 100 or receiving vehicle 106 has completed turning. Turn/obstacle completion detector 270 can detect when a turn has been completed or an obstacle has been successfully navigated in other ways as well.

Figure 5:
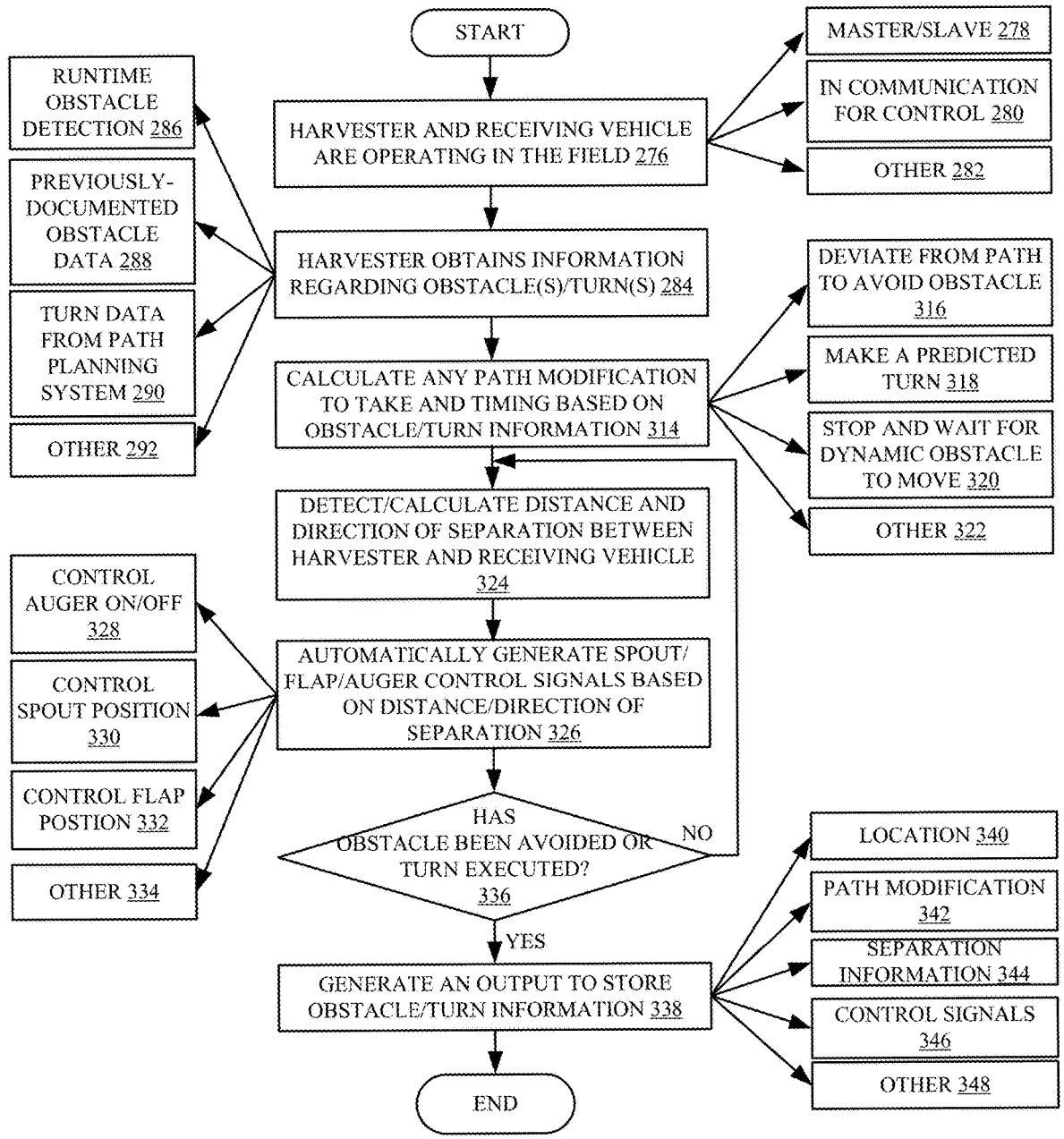
FIG. 5 is a flow diagram illustrating one example of the operation of an agricultural system.

FIG. 5 is a flow diagram illustrating one example of the operation of agricultural system 140. It is first assumed that harvester 100 and receiving vehicle 106 are operating in a field, such as field 102, as indicated by block 276 in the flow diagram of FIG. 5. In one example, harvester 100 and vehicle 106 are operating in a master/slave relationship as indicated by block 278, in which harvester 100 can control some aspects of vehicle 106 to keep the two vehicles in a desired spatial relationship relative to one another. Also, in one example, harvester 100 and vehicle 106 can communicate over link 150 or can communicate in other ways so that harvester 100 can control vehicle 106 in other ways, as indicated by block 280. Harvester 100 and receiving vehicle 106 can be operating in other ways as well, as indicated by block 280. Harvester 100 and receiving vehicle 106 can be operating in other ways as well, as indicated by block 282.

At some point, harvester 100 obtains information regarding an upcoming obstacle or turn, as indicated by block 284. The information about the obstacle or turn can be obtained during runtime obstacle detection, as indicated by block 286 or it can be obtained from previously documented obstacle data (such as data stored on remote server computing system 144) as indicated by block 288. Harvester 100 can obtain turn data from path control system 198 or path planning system 168, as indicated by block 290 in the flow diagram of FIG. 5. The harvester can obtain information regarding obstacles and/or turns in other ways as well, as indicated by block 282.

Figure 6:
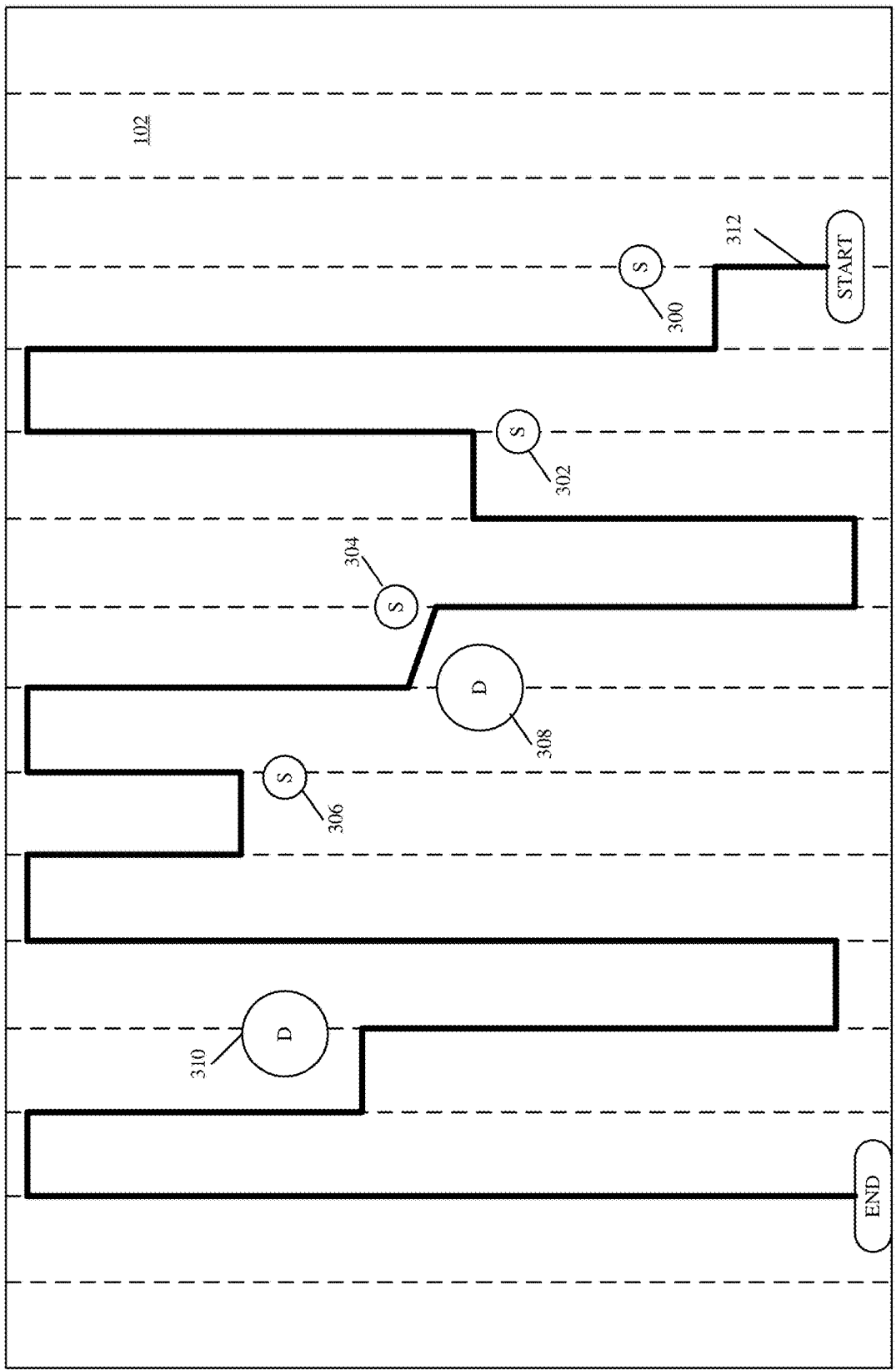
FIG. 6 is a pictorial illustration in which a harvester and receiving vehicle encountering a dynamic obstacle.

FIG. 6, for instance, shows one example field 102 with a plurality of static obstacles 300, 302, 304, and 306, and a plurality of dynamic obstacles 308 and 310. In the example shown in FIG. 6, a scout vehicle that has obstacle data detection and logging system 142 travels a route through field 102 indicated by route line 312. In traveling route 312, the scouting vehicle encounters, detects, and logs the location of each of the obstacles 300-310 and also identifies the type of obstacle (whether the obstacle is a static or dynamic obstacle). The information can be sent to harvester 100 or remote server computing system 144 or elsewhere. Path planning system 168 (and/or path control system 198) then calculates any path modifications and the timing and/or location of those modifications to the current path that will take place based upon the detected obstacles and/or turn information received from obstacle data detection and logging system 142 and/or remote server computing system 144. Calculating any path modifications and actions, along with the corresponding timing, is indicated by block 314 in the flow diagram illustrated in FIG. 5. In one example, the calculated path modification may indicate a deviation from the path in order to avoid an obstacle (such as shown in FIG. 1) as indicated by block 316. In another example, the path modification may be to take a predicted turn as indicated by block 318. In another example, the path modification may be to stop and wait for a dynamic obstacle to move out of the way (such as discussed above with respect to FIG. 2) as indicated by block 320. Calculating any path modifications and actions and the corresponding timing can be done in a wide variety of other ways as well, as indicated by block 322.

Then, as the path modification or action is being performed, vehicle relative position detector 260 detects and/or calculates the distance and direction of separation between harvester 100 and receiving vehicle 106, as indicated by block 324. Based upon the detected or calculated distance and direction of separation between the vehicles, unloading control system 208 automatically generates spout, flap, and auger control signals, as indicated by block 326 in the flow diagram of FIG. 5. By automatically it is meant that the signals are generated without further human involvement except, perhaps, to initiate or authorize the signals.

For instance, auger on/off control signal generator 268 can automatically generate an auger on/off control signal to turn on or off the unloading auger in harvester 100. Controlling the auger is indicated by block 328. Spout position control signal generator 264 can also automatically generate control signals to control spout 112 on harvester 100. The position of the spout relative to the frame of harvester 100 can be controlled in order to better direct harvested material into the receiving vehicle 106. Controlling spout position is indicated by block 330 in the flow diagram of FIG. 5.

Flap position control signal generator 266 can automatically generate control signals to control the position of flap 114 in order to control the trajectory of harvested material exiting spout 112. Controlling flap position is indicated by block 332. Automatically generating a spout, flap, and/or auger control signal can be done in a wide variety of other ways as well, as indicted by block 334.

Turn/obstacle completion detector 270 then detects whether the obstacle has been successfully avoided or the turn navigation completed, as indicated by block 336. If not, processing reverts to block 324 where unloading control system 208 continues to monitor the distance and direction of separation between the vehicles and control signals are automatically generated. However, if, at block 336, it is determined that the obstacle has been avoided or the turn executed, then turn/obstacle completion detector 270 generates a signal indicating this and communication system 186 generates an output to store the obstacle and/or turn information for later use (such as at remote server computing system 144 or elsewhere). The information can be used by remote server computing system 144 to perform analytics in order to identify better ways to perform path planning or machine control. This can improve efficiency or other performance criteria (such as to reduce operator fatigue, decrease harvest time, increase fuel efficiency, etc.). The information can also be downloaded from remote server computing system 144 for use during a subsequent operation (such as a subsequent pass of harvester 100 during the harvesting operation, during a subsequent tillage, planting, application, or harvesting operation, etc.). Generating the output is indicated by block 338 in the flow diagram of FIG. 5. The obstacle or turn information can include location information 340 indicating the location of the obstacle or turn, path modification information 342 indicative of how the path was modified in view of the obstacle or turn, the separation information 344 indicating the distance and direction of separation between the two vehicles during the route modification or path modification, the control signals 346 that were generated during the execution of the path modification, the type of obstacle, and any of a wide variety of other information 348. In one example, any time a control signal is changed, that information is logged (e.g., documented at remote server computing system 144 or elsewhere) where it can be used for analytics (such as how to improve path planning, control, or other operations in the future), as well as for continued control (such as in generating control signals as the harvester 100 approaches the same spot on the next pass), and for any other operations.

Figure 7:
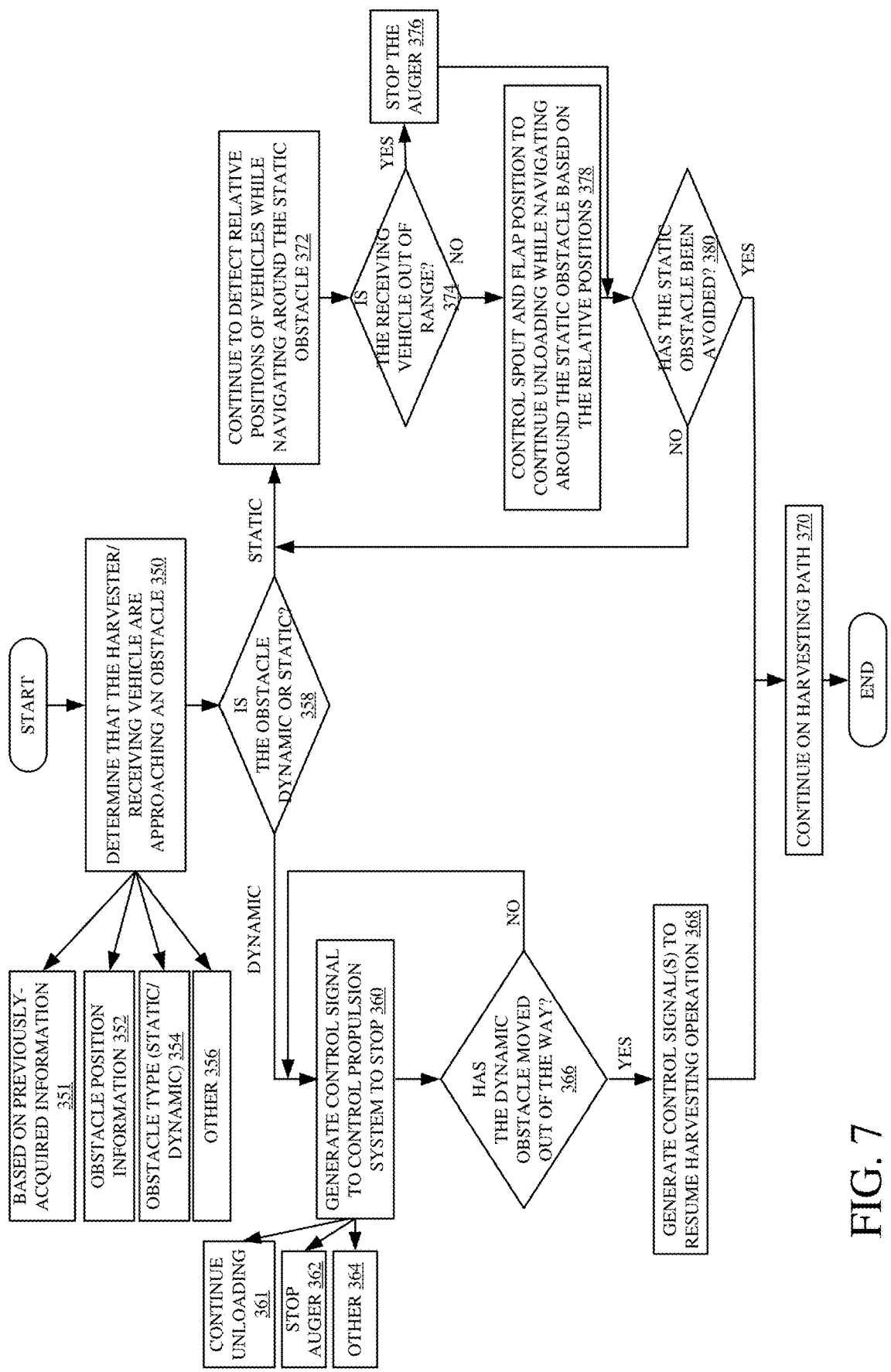
FIG. 7 is a flow diagram showing one example of the operation of an unloading control system during obstacle avoidance.

FIG. 7 is a flow diagram illustrating one example of the operation of unloading control system 208 in generating control signals during obstacle avoidance, in more detail. It is first determined that the harvester 100 and receiving vehicle 106 (or one of them) are approaching an obstacle, as indicated by block 350 in the flow diagram of FIG. 7. For instance, agricultural harvester 100 may receive an obstacle map 174 from remote server computing system 144, or may receive an input from obstacle data detection and logging system 142, indicating the location of an obstacle, and then determine that, based upon the location sensing system 188, that harvester 100 is approaching that obstacle. Determining that the harvester 100 and/or receiving vehicle 106 are approaching an obstacle based on previously-acquired data (such as an obstacle map or other previously-acquired data) is indicated by block 351 in the flow diagram of FIG. 7. Determining that the harvester 100 and/or receiving vehicle 106 are approaching an obstacle based upon obstacle position information detected by detectors on harvester 100 (or receiving vehicle 106) during the harvesting operation is indicated by block 352. The obstacle type, the direction of travel of the obstacle (if the obstacle is dynamic), and/or the travel speed of the obstacle (again, if the obstacle is dynamic), may also be determined or provided, as indicated by block 354. Other information may be obtained as well, in order to determine that an obstacle is approaching as indicated by block 356.

Unloading control system 208 then determines whether the obstacle is dynamic or static, if needed, (e.g., if this information is not already known) as indicated by block 358. If the obstacle is dynamic, then unloading control system 298 automatically generates an output indicating that the propulsion system 194 should stop the forward movement of harvester 100. Master/slave control system 196 then coordinates with master/slave control system 238 on receiving vehicle 608 to stop the forward movement of receiving vehicle 106 as well. Automatically generating a control signal to control the propulsion system to stop the vehicle is indicated by block 360. In one example, auger on/off control signal generator 368 can also automatically generate a control signal to control the unloading auger to continue unloading even while the vehicles are stopped, as indicated by block 361 in FIG. 7. Continuing the unloading operation while the vehicles are stopped can reduce downtime. The auger on/off control signal generator 368 can also automatically generate a control signal to stop the unloading auger while the vehicles are stopped, as indicated by block 362. Other control signals can be generated as well, as indicated by block 364.

Unloading control system 208 then waits until the dynamic obstacle has moved out of the way, as indicated by block 366. Once the dynamic obstacle has moved out of the way, then unloading control system 208 automatically generates control signals to resume the harvesting operation (such as to control the propulsion system 194 to continue forward movement along the harvesting path and to turn the auger back on (if it was turned off) etc. Generating control signals to resume the harvesting operation is indicated by block 368 in the flow diagram of FIG. 7. Harvester 100 and receiving vehicle 106 then continue on the harvesting path, as indicated by block 370.

If, at block 358 it is determined that the obstacle is a static obstacle, then vehicle relative position detector 260 continues to detect the relative positions of the two vehicles (harvester 100 and receiving vehicle 106) while navigating around the static obstacle. Continuing to detect the relative positions is indicated by block 372 in the flow diagram of FIG. 7. Out-of-range detector 262 also continues to determine whether the receiving vehicle is out of range of the unloading functionality, meaning that the unloading functionality cannot project the harvested material far enough to reach the receiving vehicle 106. Determining whether the receiving vehicle is out of range is indicated by block 374. If the receiving vehicle is indeed out of range, then out-of-range detector 262 generates a signal indicative of this and provides it to auger on/off control signal generator 268. Generator 268 automatically generates a control signal to turn off the unloading auger as indicated by block 376.

If, at block 374, it is determined that the receiving vehicle is not out of range, then spout position control signal generator 264 and flap position control signal generator 266 automatically generate control signals to control position of spout 112 and flap 114 to continue unloading harvested material while navigating around the static obstacle, based upon the relative position output by vehicle relative position detector 260. Automatically controlling the spout and flap position in this way is indicated by block 378 in the flow diagram of FIG. 7. Unloading control system 208 continues to operate, detecting the relative position of the two vehicles, determining whether the receiving vehicle is out of range, and generating control signals, until the static obstacle has been avoided (e.g., until the harvester 100 and/or receiving vehicle 106 have returned to the harvesting routes after navigating around the obstacle). Making a determination as to whether the static obstacle has been avoided is indicated by block 380 in the flow diagram of FIG. 7. Once the static obstacle has been avoided and the vehicles are back on their harvesting routes, then they continue on the harvesting path, as indicated by block 370.

Figure 8:
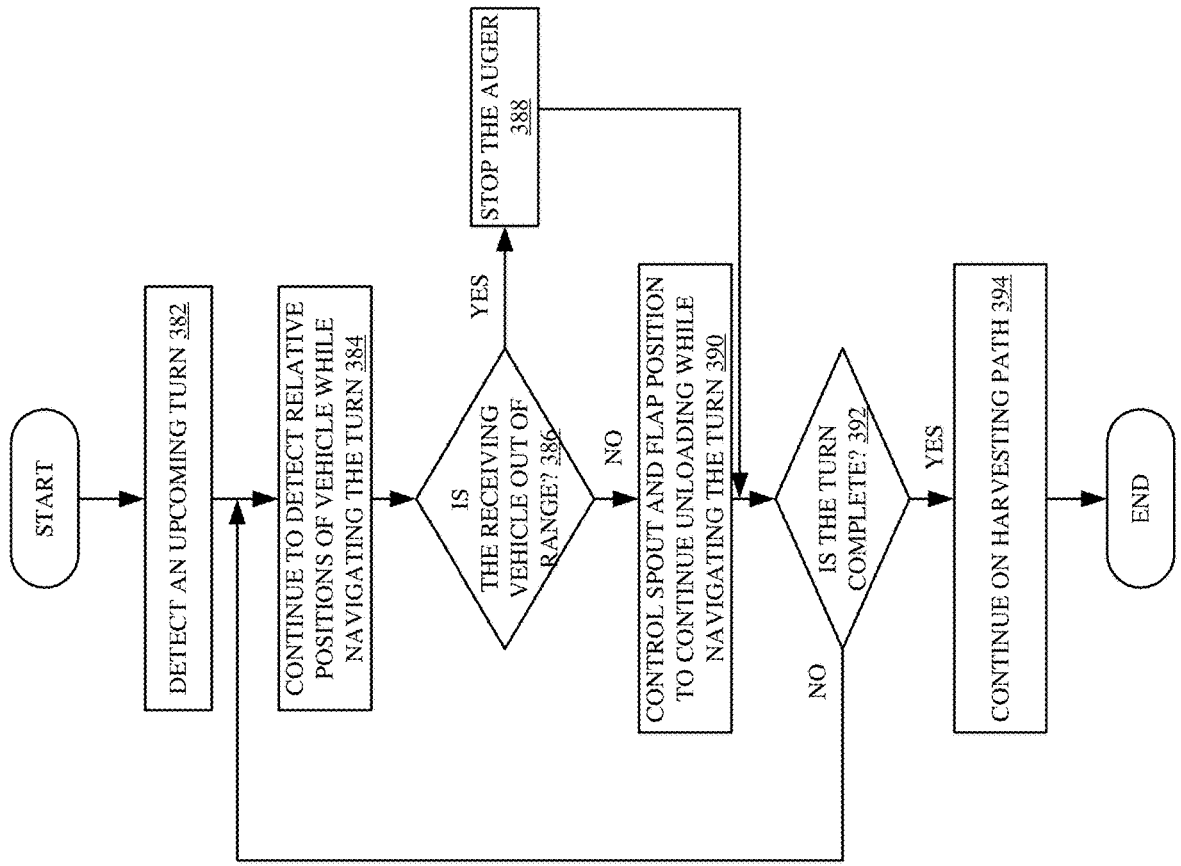
FIG. 8 is a flow diagram showing one example of the operation of an unloading control system during turn navigation.

FIG. 8 is a flow diagram illustrating one example of the operation of unloading control system 208 in automatically generating control signals when an upcoming turn is predicted, such as by turn predictor 202 in path control system 198. Turn predictor 202 first detects an upcoming turn and generates prediction information indicative of the predicted turn, such as the location and direction of the turn, the time lapse or distance to be covered before the turn is going to be initiated, and other information. Detecting an upcoming turn is indicated by block 382 in the flow diagram of FIG. 8. Vehicle relative position detector 260 continues to detect the relative positions of harvester 100 with respect to receiving vehicle 106 while navigating through the turn. Continuing to detect the relative position vehicles is indicated by block 384 in the flow diagram of FIG. 8. Based on the relative positions, out-of-range detector 262 also continues to detect whether the receiving vehicle 106 is out of range of the unloading functionality, as indicated by block 386. If so, auger on/off control signal generator 268 generates a control signal to turn off the auger 220 so that no harvested material is lost while the receiving vehicle 106 is out of range. Stopping the auger is indicated by block 388 in the flow diagram of FIG. 8.

As long as the receiving vehicle 106 is still in range of the unloading functionality 210, spout position control signal generator 264 and flap position control signal generator 266 automatically generate control signals to control the position of the spout 112 and flap 114 to continue unloading while navigating through the turn. Generating the spout and flap control signals is indicated by block 390 in the flow diagram of FIG. 8.

Turn/obstacle completion detector 270 detects when the turn is complete as indicated by block 392. Until the turn is complete, processing reverts to block 384 where the relative positions of the vehicles is detected and control signals are generated based on that relative position.

Once the turn is complete, as indicated by block 392, then harvester 100 and receiving vehicle 106 continue harvesting along the harvesting path. Continuing along the harvesting path is indicated by block 394 in the flow diagram of FIG. 8.

It can thus be seen that the present description detects an upcoming obstacle or turn. The present system detects the relative position of the harvester 100 with respect to the receiving vehicle 106. Automatically generates control signals to control the position of an unloading spout, a flap, and an unloading auger based on the relative position of the harvester 100 and receiving vehicle 106 during navigation around the obstacle or around a turn. This reduces grain loss and also reduces the fatigue level of the operator thus increasing the performance efficiency of the harvesting operation.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 9:
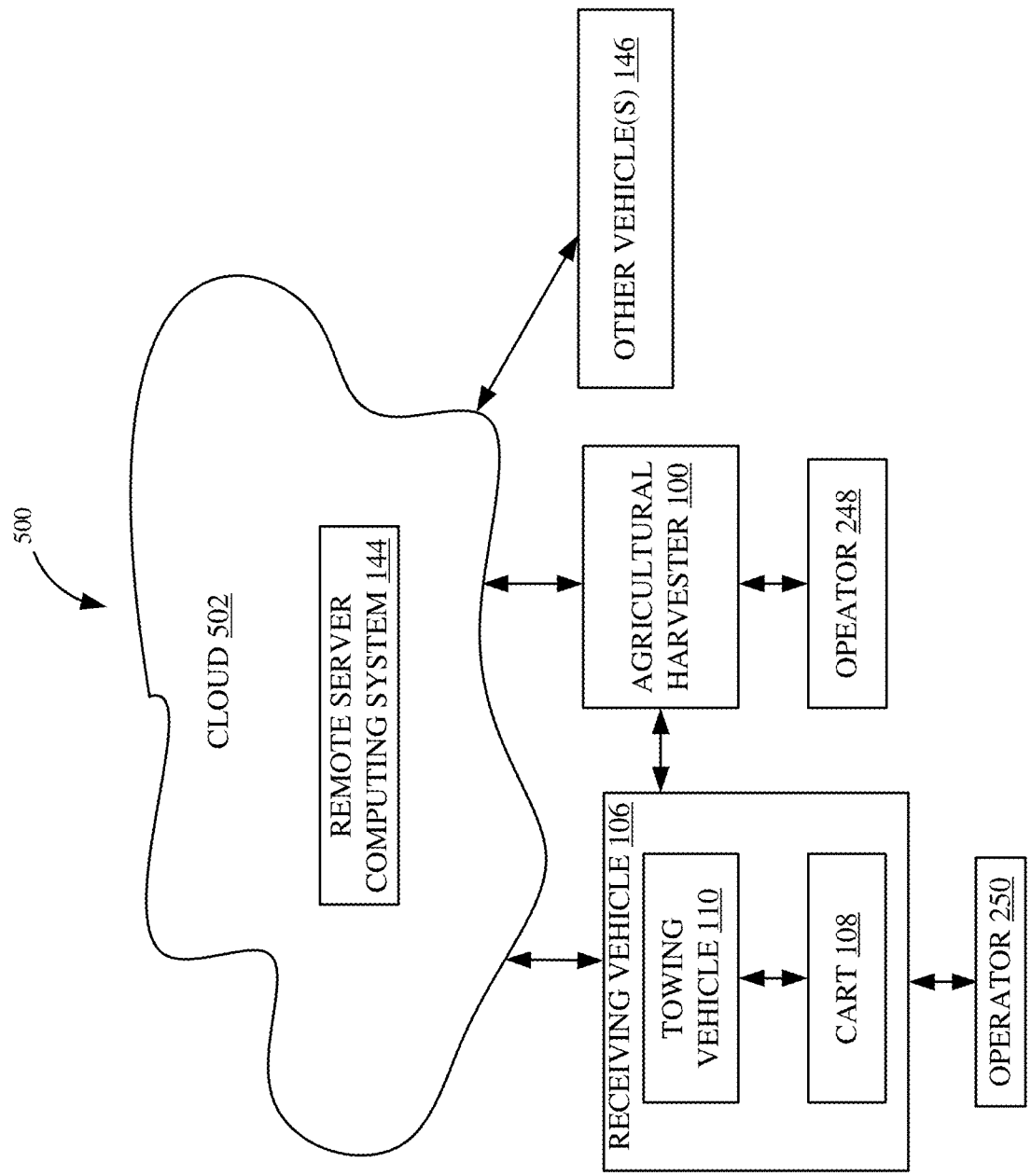
FIG. 9 is a block diagram showing one example of the architectural system shown in FIG. 4 deployed in a remote server architecture.

FIG. 9 is a block diagram of harvester 100, shown in FIG. 3, except that harvester 100 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 9, some items are similar to those shown in previous FIGS. and they are similarly numbered. FIG. 9 specifically shows that remote server computing system 144 can be located at a remote server location 502. Therefore, harvester 100 accesses those systems through remote server location 502.

Regardless of where the items are located, the items can be accessed directly by harvester 100, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
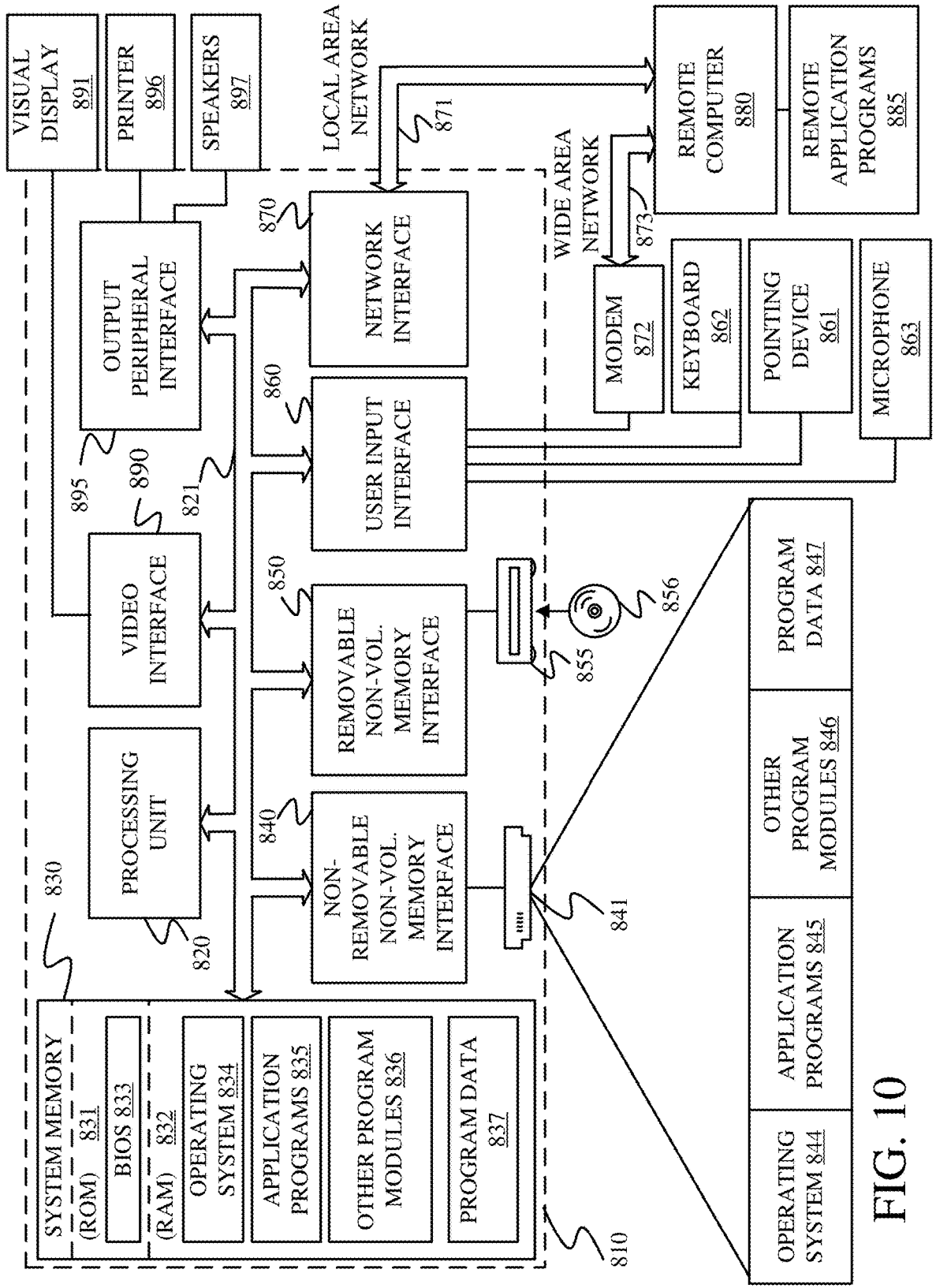
FIG. 10 is a block diagram showing one example of a computing environment that can be used in the architectures and systems shown herein.

FIG. 10 is one example of a computing environment in which elements of previous FIGS., or parts of it, (for example) can be deployed. With reference to FIG. 10, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural system, comprising:
a vehicle position detector that receives a location of an obstacle in a field and that detects a relative position of an agricultural harvester relative to a material receiving vehicle as the obstacle is avoided by at least one of the agricultural harvester or the material receiving vehicle; and a control signal generator that generates a control signal to automatically control unloading functionality on the agricultural harvester based on the detected relative position of the agricultural harvester relative to the material receiving vehicle and applies the control signal to the unloading functionality while the obstacle is avoided by at least one of the agricultural harvester or the receiving vehicle.

Example 2 is the agricultural system of any or all previous examples and further comprising:
an out-of-range detector that detects when the material receiving vehicle is out of range of the unloading functionality based on the detected relative position of the agricultural harvester relative to the material receiving vehicle and generates an out-of-range signal indicative of whether the material receiving vehicle is out of range of the unloading functionality.

Example 3 is the agricultural system of any or all previous examples wherein the unloading functionality includes an unloading auger.

Example 4 is the agricultural system of any or all previous examples wherein the control signal generator comprises:
an auger control signal generator configured to generate an auger control signal based on the out-of-range signal.

Example 5 is the agricultural system of any or all previous examples wherein the agricultural harvester includes a propulsion system and wherein the vehicle position detector receives, in addition to the position of the obstacle, an obstacle identifier indicative of whether the obstacle is a static obstacle or a dynamic obstacle.

Example 6 is the agricultural system of any or all previous examples wherein the control signal generator is configured to generate a propulsion control signal to control the propulsion system based on the obstacle identifier.

Example 7 is the agricultural system of any or all previous examples wherein the unloading functionality includes a spout that is movable relative to a frame of the agricultural harvester and wherein the control signal generator comprises:
a spout position control signal generator configured to generate, as the control signal, a spout control signal that automatically controls a position of the spout based on the relative position of the agricultural harvester relative to the material receiving vehicle.

Example 8 is the agricultural system of any or all previous examples wherein the unloading functionality includes an unloading spout and a flap that is movable relative to the unloading spout and wherein the control signal generator comprises:
a flap position control signal generator configured to generate, as the control signal, a flap control signal that automatically controls a position of the flap based on the position of the agricultural harvester relative to the material receiving vehicle.

Example 9 is the agricultural system of any or all previous examples and further comprising:
an obstacle data detection and logging system configured to detect a set of obstacles and corresponding locations in the field and provide obstacle information indicative of the set of obstacles and corresponding locations to a remote server computing system.

Example 10 is the agricultural system of any or all previous examples wherein the remote server computing system is configured to store the obstacle information as an obstacle map.

Example 11 is the agricultural system of any or all previous examples and further comprising:
a communication system configured to provide the location of the obstacle and an indication of the control signal to a remote server computing system for access during a later operation.

Example 12 is the agricultural system of any or all previous examples wherein the control signal generator is configured to obtain previously-acquired information comprising at least one of previously-acquired obstacle location information or previously-acquired control signal information from the remote server computing system and generate the control signal based on the previously-acquired information.

Example 13 is the agricultural system of any or all previous examples wherein the vehicle position detector is configured to detect coordinates of the agricultural harvester and the material receiving vehicle and obtain the relative position based on the coordinates.

Example 14 is an agricultural harvester control system, comprising:
at least one processor;
a data store storing computer executable instructions which, when executed by the at least one processor, cause the at least one processor to perform steps comprising:
receiving a location of an obstacle in a field;
detecting a relative position of an agricultural harvester relative to a material receiving vehicle as the obstacle is avoided by the agricultural harvester and the material receiving vehicle;
generating a control signal to automatically control unloading functionality on the agricultural harvester based on the detected relative position of the agricultural harvester relative to the material receiving vehicle; and
applying the control signal to the unloading functionality while the obstacle is avoided by the agricultural harvester and the receiving vehicle.

Example 15 is the agricultural harvester control system of any or all previous examples wherein the steps further comprise:
detecting when the material receiving vehicle is out of range of the unloading functionality based on the detected relative position of the agricultural harvester relative to the material receiving vehicle; and
generating an out-of-range signal indicative of whether the material receiving vehicle is out of range of the unloading functionality, and wherein the unloading functionality includes an unloading auger and wherein generating the control signal comprises generating an auger control signal based on the out-of-range signal.

Example 16 is the agricultural harvester control system of any or all previous examples wherein the unloading functionality includes a spout that is movable relative to a frame of the agricultural harvester and wherein generating the control signal comprises:
generating, as the control signal, a spout control signal that automatically controls a position of the spout based on the relative position of the agricultural harvester relative to the material receiving vehicle.

Example 17 is the agricultural harvester control system of any or all previous examples wherein the unloading functionality includes an unloading spout and a flap that is movable relative to the unloading spout and wherein generating the control signal comprises:

generating, as the control signal, a flap control signal that automatically controls a position of the flap based on the relative position of the agricultural harvester relative to the material receiving vehicle.

Example 18 is the agricultural harvester control system of any or all previous examples and further comprising:
detecting a set of obstacles and corresponding locations in the field;
providing obstacle information indicative of the set of obstacles and corresponding locations to a remote server computing system; and
storing the obstacle information as an obstacle map.

Example 19 is an agricultural harvester, comprising:
a harvesting system configured to harvest material from a field;
unloading functionality configured to unload the material from the harvester to a material receiving vehicle;
a vehicle position detector that receives a location of an obstacle in the field and that detects a relative position of the agricultural harvester relative to the material receiving vehicle as the obstacle is avoided by the agricultural harvester and the material receiving vehicle;
a control signal generator that generates a control signal to automatically control the unloading functionality on the agricultural harvester based on the detected relative position of the agricultural harvester relative to the material receiving vehicle and applies the control signal to the unloading functionality while the obstacle is avoided by the agricultural harvester and the receiving vehicle; and
a communication system configured to provide an indication of the location of the obstacle, an indication of the relative position, and an indication of the control signal to a remote server computing system.

Example 20 is the agricultural harvester of any or all previous examples wherein the unloading functionality includes a spout that is movable relative to a frame of the agricultural harvester and a flap that is movable relative to the spout and wherein the control signal generator comprises:
a spout position control signal generator configured to generate, as the control signal, a spout control signal that automatically controls a position of the spout based on the relative position of the agricultural harvester relative to the material receiving vehicle; and
a flap position control signal generator configured to generate, as the control signal, a flap control signal that automatically controls a position of the flap based on the relative position of the agricultural harvester relative to the material receiving vehicle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural system, comprising:
a vehicle position detector that receives a location of an obstacle in a field and that determines a relative position of an agricultural harvester relative to a material receiving vehicle as the obstacle is avoided, by at least one of the agricultural harvester or the material receiving vehicle, during a time when unloading functionality on the agricultural harvester transfers material from the agricultural harvester to the material receiving vehicle; and
a control signal generator that generates a control signal to automatically control the unloading functionality on the agricultural harvester based on the relative position of the agricultural harvester relative to the material receiving vehicle and applies the control signal to the unloading functionality while the obstacle is avoided by at least one of the agricultural harvester or the material receiving vehicle.

2. The agricultural system of claim 1 and further comprising:
an out-of-range detector that detects when the material receiving vehicle is out of range of the unloading functionality based on the relative position of the agricultural harvester relative to the material receiving vehicle and generates an out-of-range signal indicative of whether the material receiving vehicle is out of range of the unloading functionality.

3. The agricultural system of claim 2 wherein the unloading functionality includes an unloading auger.

4. The agricultural system of claim 3 wherein the control signal generator comprises:
an auger control signal generator configured to generate an auger control signal based on the out-of-range signal.

5. The agricultural system of claim 1 wherein the agricultural harvester includes a propulsion system and wherein the vehicle position detector receives, in addition to the location of the obstacle, an obstacle identifier indicative of whether the obstacle is a static obstacle or a dynamic obstacle.

6. The agricultural system of claim 5 wherein the control signal generator is configured to generate a propulsion control signal to control the propulsion system based on the obstacle identifier.

7. The agricultural system of claim 1 wherein the unloading functionality includes a spout that is movable relative to a frame of the agricultural harvester and wherein the control signal generator comprises:
a spout position control signal generator configured to generate, as the control signal, a spout control signal that automatically controls a position of the spout based on the relative position of the agricultural harvester relative to the material receiving vehicle.

8. The agricultural system of claim 1 wherein the unloading functionality includes an unloading spout and a flap that is movable relative to the unloading spout and wherein the control signal generator comprises:
a flap position control signal generator configured to generate, as the control signal, a flap control signal that automatically controls a position of the flap based on the position of the agricultural harvester relative to the material receiving vehicle.

9. The agricultural system of claim 1 and further comprising:
an obstacle data detection and logging system configured to detect a set of obstacles and corresponding locations in the field and provide obstacle information indicative of the set of obstacles and corresponding locations to a remote server computing system.

10. The agricultural system of claim 9 wherein the remote server computing system is configured to store the obstacle information as an obstacle map.

11. The agricultural system of claim 1 and further comprising:

a communication system configured to provide the location of the obstacle and an indication of the control signal to a remote server computing system for access during a later operation.

12. The agricultural system of claim 11 wherein the control signal generator is configured to obtain previously-acquired information comprising at least one of previously-acquired obstacle location information or previously-acquired control signal information from the remote server computing system and generate the control signal based on the previously-acquired information.

13. The agricultural system of claim 1 wherein the vehicle position detector is configured to detect coordinates of the agricultural harvester and the material receiving vehicle and obtain the relative position based on the coordinates.

14. An agricultural harvester control system, comprising:
at least one processor; and
a data store storing computer executable instructions which, when executed by the at least one processor, cause the at least one processor to perform steps comprising:
receiving a location of an obstacle in a field;
determining a relative position of an agricultural harvester relative to a material receiving vehicle as the obstacle is avoided, by at least one of the agricultural harvester or the material receiving vehicle, during a time when unloading functionality on the agricultural harvester transfers material from the agricultural harvester to the material receiving vehicle;
generating a control signal to automatically control unloading functionality on the agricultural harvester based on the relative position of the agricultural harvester relative to the material receiving vehicle; and
applying the control signal to the unloading functionality while the obstacle is avoided by the agricultural harvester and the material receiving vehicle.

15. The agricultural harvester control system of claim 14 wherein the steps further comprise:
detecting when the material receiving vehicle is out of range of the unloading functionality based on the relative position of the agricultural harvester relative to the material receiving vehicle; and
generating an out-of-range signal indicative of whether the material receiving vehicle is out of range of the unloading functionality, and wherein the unloading functionality includes an unloading auger and wherein generating the control signal comprises generating an auger control signal based on the out-of-range signal.

16. The agricultural harvester control system of claim 14 wherein the unloading functionality includes a spout that is movable relative to a frame of the agricultural harvester and wherein generating the control signal comprises:
generating, as the control signal, a spout control signal that automatically controls a position of the spout based on the relative position of the agricultural harvester relative to the material receiving vehicle.

17. The agricultural harvester control system of claim 14 wherein the unloading functionality includes an unloading spout and a flap that is movable relative to the unloading spout and wherein generating the control signal comprises:
generating, as the control signal, a flap control signal that automatically controls a position of the flap based on the relative position of the agricultural harvester relative to the material receiving vehicle.

18. The agricultural harvester control system of claim 14 and further comprising:
detecting a set of obstacles and corresponding locations in the field;
providing obstacle information indicative of the set of obstacles and corresponding locations to a remote server computing system; and
storing the obstacle information as an obstacle map.

19. An agricultural harvester, comprising:
a harvesting system configured to harvest material from a field;
unloading functionality configured to unload the material from the agricultural harvester to a material receiving vehicle;
a vehicle position detector that receives a location of an obstacle in the field and that determines a relative position of the agricultural harvester relative to the material receiving vehicle as the obstacle is avoided, by at least one of the agricultural harvester or the material receiving vehicle, during a time when unloading functionality on the agricultural harvester transfers material from the agricultural harvester to the material receiving vehicle;
a control signal generator that generates a control signal to automatically control the unloading functionality on the agricultural harvester based on the relative position of the agricultural harvester relative to the material receiving vehicle and applies the control signal to the unloading functionality while the obstacle is avoided by the agricultural harvester and the material receiving vehicle; and
a communication system configured to provide an indication of the location of the obstacle, an indication of the relative position, and an indication of the control signal to a remote server computing system.

20. The agricultural harvester of claim 19 wherein the unloading functionality includes a spout that is movable relative to a frame of the agricultural harvester and a flap that is movable relative to the spout and wherein the control signal generator comprises:
a spout position control signal generator configured to generate, as the control signal, a spout control signal that automatically controls a position of the spout based on the relative position of the agricultural harvester relative to the material receiving vehicle; and
a flap position control signal generator configured to generate, as the control signal, a flap control signal that automatically controls a position of the flap based on the relative position of the agricultural harvester relative to the material receiving vehicle.

* * * * *